US009942696B2

(12) United States Patent
Unter Ecker

(10) Patent No.: US 9,942,696 B2
(45) Date of Patent: Apr. 10, 2018

(54) COMMUNICATING EVENT DATA FROM AN EVENT DEVICE TO AN ACTION DEVICE

(71) Applicant: Telefonaktiebolaget L M Ericsson (publ), Stockholm (SE)

(72) Inventor: Oliver Unter Ecker, Los Angeles, CA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 283 days.

(21) Appl. No.: 14/853,737

(22) Filed: Sep. 14, 2015

(65) Prior Publication Data
US 2017/0078428 A1    Mar. 16, 2017

(51) Int. Cl.
G06F 15/16    (2006.01)
H04W 4/00    (2018.01)
H04L 12/64    (2006.01)

(52) U.S. Cl.
CPC ......... H04W 4/008 (2013.01); H04L 12/6418 (2013.01)

(58) Field of Classification Search
CPC ............. H04L 12/2803; H04L 12/2814; H04L 12/2818; H04L 12/2834; H04W 4/005; H04W 4/008
See application file for complete search history.

(56) References Cited

U.S. PATENT DOCUMENTS

| 7,293,279 | B1* | 11/2007 | Asmussen | H04N 5/4401 348/E5.099 |
| 2003/0070182 | A1 | 4/2003 | Pierre et al. | |
| 2006/0242295 | A1* | 10/2006 | Husemann | G06F 19/3481 709/224 |
| 2009/0245266 | A1 | 10/2009 | Cho et al. | |
| 2011/0200304 | A1 | 8/2011 | Rutledge | |
| 2013/0212615 | A1 | 8/2013 | Schultz | |
| 2015/0264028 | A1* | 9/2015 | Kim | H04L 43/08 726/3 |
| 2016/0142356 | A1* | 5/2016 | Nayak | H04L 51/18 709/206 |

FOREIGN PATENT DOCUMENTS

| EP | 1753180 A1 | 2/2007 |
| EP | 1826955 A1 | 8/2007 |

OTHER PUBLICATIONS

Specification of the Bluetooth System, Covered Core Package Version: 4.0, Current Master TOC, published on Jun. 30, 2010, 2302 pages.

* cited by examiner

*Primary Examiner* — Shean Tokuta
(74) *Attorney, Agent, or Firm* — Nicholson De Vos Webster & Elliott, LLP

(57) ABSTRACT

A hub device receives a first event message from an event device that describes an event on the event device. The hub device converts the first event message to a second event message that is understandable to the action device that is communicatively coupled with the hub device through a communication protocol and divides the second event message into multiple chunks, each of which having a size within a data value update limit of the communication protocol. The action device is subscribed to receive updates from the hub device. The hub device transmits each respective one of the chunks over the communication protocol to the action device to allow the action device to take one or more actions in response to the second event message.

18 Claims, 12 Drawing Sheets

COMMUNICATING EVENT DATA FROM AN EVENT DEVICE TO AN ACTION DEVICE

FIELD

Embodiments of the invention relate to the field of computing and more specifically to communicating event data from an event device to an action device.

BACKGROUND

Electronic devices are increasingly becoming more connected to each other or services. For instance, many electronic devices that did not traditionally communicate with each other or communicate with services are increasingly having that capability through the Internet of Things (IoT). Example IoT devices include lights, air conditioning units, refrigerators, ovens, baby monitors, access security systems, fitness bands, furnaces, etc. IoT devices may communicate with mobile devices (e.g., smartphones, tablets, wearable devices, etc.) that are increasingly the cornerstone of customers' digital life including media consumption. Connections to certain devices are typically limited. For instance, in case of a mobile device connecting to a television, the connection is typically limited to two functions; the TV serving as a "play-to" streaming target for media applications; or the mobile device serving as a mobile "companion" to functionality provided by the TV. In the former case, the TV is relegated to a largely passive display device; in the latter case, the mobile device is dumbed down. In either case, the TV knows nothing about "what's going on" on the mobile device, or what it may have knowledge of.

Mobile devices are increasingly acting as a de-facto personal communication hub and may encounter many events. For example, mobile events may occur directly on the mobile device (e.g., a phone call or text message being received) or through other devices connected to the mobile device (e.g., a connected heart rate monitor reporting a heart rate value).

SUMMARY

In an embodiment, a method for communicating an event from an event device to an action device to take one or more actions based on the event include: receiving, by a hub device, a first event message from the event device that describes the event on the event device, where the event device is located remotely from the hub device; converting, by the hub device, the first event message to a second event message that is understandable to the action device that is communicatively coupled with the hub device through a communication protocol; dividing, by the hub device, the second event message into a plurality of chunks, where each one of the plurality of chunks is of a size within a data value update limit of the communication protocol, and where the action device is subscribed to receive updates from the hub device; and transmitting, by the hub device to the action device, each respective one of the plurality of chunks over the communication protocol to allow the action device to take one or more actions in response to the second event message.

In an embodiment, a hub device that is communicatively coupled with an event device and an action device for communicating an event from the event device to the action device comprises: a set of one or more processors; and a non-transitory machine-readable storage medium containing code, which when executed by the set of one or more processors, causes the hub device to: receive a first event message from the event device that describes the event on the event device, where the event device is located remotely from the hub device; convert the first event message to a second event message that is understandable to the action device that is communicatively coupled with the hub device through a communication protocol; divide the second event message into a first plurality of chunks, where each one of the first plurality of chunks is of a size within a data value update limit of the communication protocol, and where the action device is subscribed to receive updates from the hub device; and transmit, to the action device, each respective one of the first plurality of chunks over the communication protocol to allow the action device to take one or more actions in response to the second event message.

In an embodiment, a non-transitory machine-readable storage medium that provides instructions that, when executed by a processor, will cause said processor to perform operations comprising: receiving, by a hub device, a first event message from an event device that describes an event on the event device, where the event device is located remotely from the hub device; converting, by the hub device, the first event message to a second event message that is understandable to an action device that is communicatively coupled with the hub device through a communication protocol; dividing, by the hub device, the second event message into a first plurality of chunks, where each one of the first plurality of chunks is of a size within a data value update limit of the communication protocol, and where the action device is subscribed to receive updates from the hub device; and transmitting, by the hub device to the action device, each respective one of the first plurality of chunks over the communication protocol to allow the action device to take one or more actions in response to the second event message.

BRIEF DESCRIPTION OF THE DRAWINGS

The invention may best be understood by referring to the following description and accompanying drawings that are used to illustrate embodiments of the invention. In the drawings.

DESCRIPTION OF EMBODIMENTS

Figure 1:
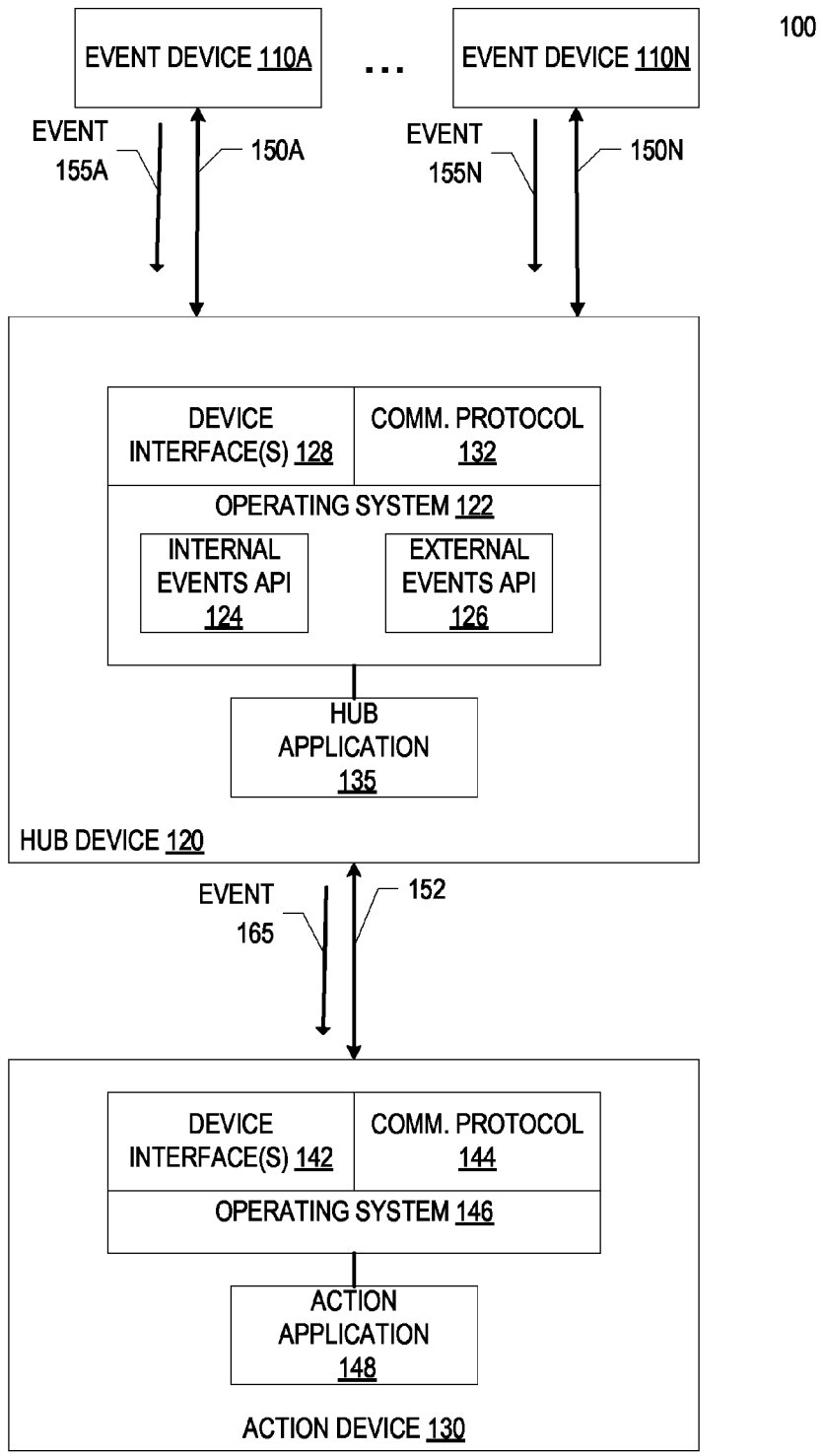
FIG. 1 illustrates an exemplary system for communicating event data from event devices to an action device to take one or more actions based on the event, according to one embodiment.

In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

A method and apparatus for communicating event data from an event device to an action device to take one or more actions based on the event is described. In an embodiment, a hub device receives an event message from an event device and communicates the event message to an action device to take one or more actions in response to the event. The hub device may communicate the event message to the action device in multiple chunks where each chunk is within a data value update limit of a communication protocol and where the action device is subscribed to receive updates from the hub device. The action device receives the chunks and reassembles the event message and takes one or more acts based on the event message.

In a specific embodiment, the hub device is a mobile device (e.g., a smartphone, a tablet, a wearable device) and the action device is a device that controls media playback (e.g., a set-top box connected to a television). The hub device may receive an event from a remote event device or directly and communicate the event information to the action device, which may customize and/or personalize the media playback experience accordingly. This may provide a greater level of usability and enjoyment to users as the device (e.g., the set-top box connected to a television) becomes integrated with the digital life that is managed by the mobile device.

FIG. 1 illustrates an exemplary system for communicating event data from event devices to an action device to take one or more actions based on the event, according to one embodiment. The system 100 includes the event devices 110A-N that are each communicatively coupled with the hub device 120. Each event device 110 is computing device that is capable of observing an event directly or indirectly and may be an Internet of Things (IoT) device. Example event devices include: a heart rate sensor; an air conditioning unit; an oven; a microwave; a fridge; a doorbell; a baby monitor; an access security system; a phone; a fitness band; a map application; a furnace; a water heater; and a mobile application store. Of course it should be understood that these are examples and there may be different event devices that can use embodiments described herein. The event devices 110A-N communicate events 155A-N respectively to the hub device 120. Each event is an item of interest observed directly or indirectly by an event device. Examples of particular events and how they are processed is described in greater detail later herein.

The event devices 110A-N are communicatively coupled with the hub device 120 over the communication links 150A-N respectively. One or more of the communication links 150A-N may be different than each other. For instance, some communication links may be wired while other communication links may be wireless. In a specific implementation, at least some of the communication links 150A-N are personal area communication (PAN) links, such as Bluetooth links such as Bluetooth low energy (BTLE).

The hub device 120 is a computing device that is communicatively coupled with the action device 130. The hub device 120 receives and processes event messages from the event devices 110A-N through the hub application 135. The hub application 135 may be a background process that gathers event information and communicates event information to the action device. The hub device 120 may detect events itself. Thus, the hub device 120 may also be an event device. In a specific implementation, the hub device 120 is a mobile device such as a smartphone, tablet, or wearable device. The hub device 120 includes the device interface(s) 128 that provide an interface to hardware device(s) of the hub device 120 or connected to the hub device 120 that may be capable of detecting events. Example device interfaces include a sensor (e.g., an ambient light sensor), and a radio. The hub device 120 includes the communication protocol 132 that provides the communication capabilities of the hub device 120 including communicating with the event devices 110A-N and the action device 130. In an embodiment, the protocol used for the communication protocol 132 is compliant with BTLE.

The operating system 122 of the hub device 120 includes the internal events API 124 and the external events API 126. The internal events API 124 provides an API for events that occur on the hub device 120. For instance, in case the hub device 120 is a smartphone or other device capable of receiving/placing a phone call, the internal events API 124 provides an interface to phone events such as a call being placed, a call being received, a call terminating, a call being missed, etc. The external events API 126 provides an API for events that occur externally to the hub device 120. The external events API 126 may be a publically available facility created by a third party to connect to a particular event device. For instance, an external event API may be an API for health data that is configured to connect to devices that provide such health data such as connecting to a fitness band. As another example, an external event API may be an API for home automation data that is configured to connect to a home automation device. The external events API 126 may provide homogenized/normalized data from an event device to the hub application 135. For instance, the hub application 135 may connect to the external events API 126 to receive the normalized event data from an event device instead of connecting directly to that event device.

The hub application 135 communicates event information 165 over the communication link 152 with the action application 148 on the action device 130 to provide event information for the action device 130 to act upon. The communication link 152 may be a wired link or a wireless link. In a specific implementation, the communication link 152 is a PAN link such as a BTLE link. The action device 130 is a computing device that is configured to receive and act upon event information received from the hub device 120. In a specific implementation, the action device 130 is a television system (e.g., a set-top box connected to a television display) that receives events from the hub device 120 and takes one or more acts depending on the received event information. The action device 130 includes the device interface(s) 142 that provide an interface to hardware device(s) of the action device 130 or connected to the action device 130. For instance, a device interface 142 may include an interface to control a display that is connected to the action device 130. The action device 130 also includes the communication protocol 144 that provides the communication capabilities of the action device 130 to the hub device 120. In an embodiment, the protocol used for the communication protocol 144 is compliant with BTLE. The operating system 146 of the action device 130 manages the hardware and software resources for the action device 130.

The hub application 135 connects to the action application 148. In an embodiment, the hub application 135 advertises itself as a peripheral and offering a specific service and the action application 148 is configured as a control (or sometimes referred to as a central). Upon the action application 148 discovering the hub application 135, a connection is established between the hub application 135 and the action application 148 and the action application 148 subscribes to one or more characteristics. The hub application 135 registers itself as an observer of events. Subsequently, upon receiving an event, the hub application formats the event data into a serialized format suitable for transmission. A value update is flagged to the action application 148 which in turn performs incremental reading of the serialized event data until fully received. The action application 148 deserializes the data and acts upon the data accordingly.

Figure 2:
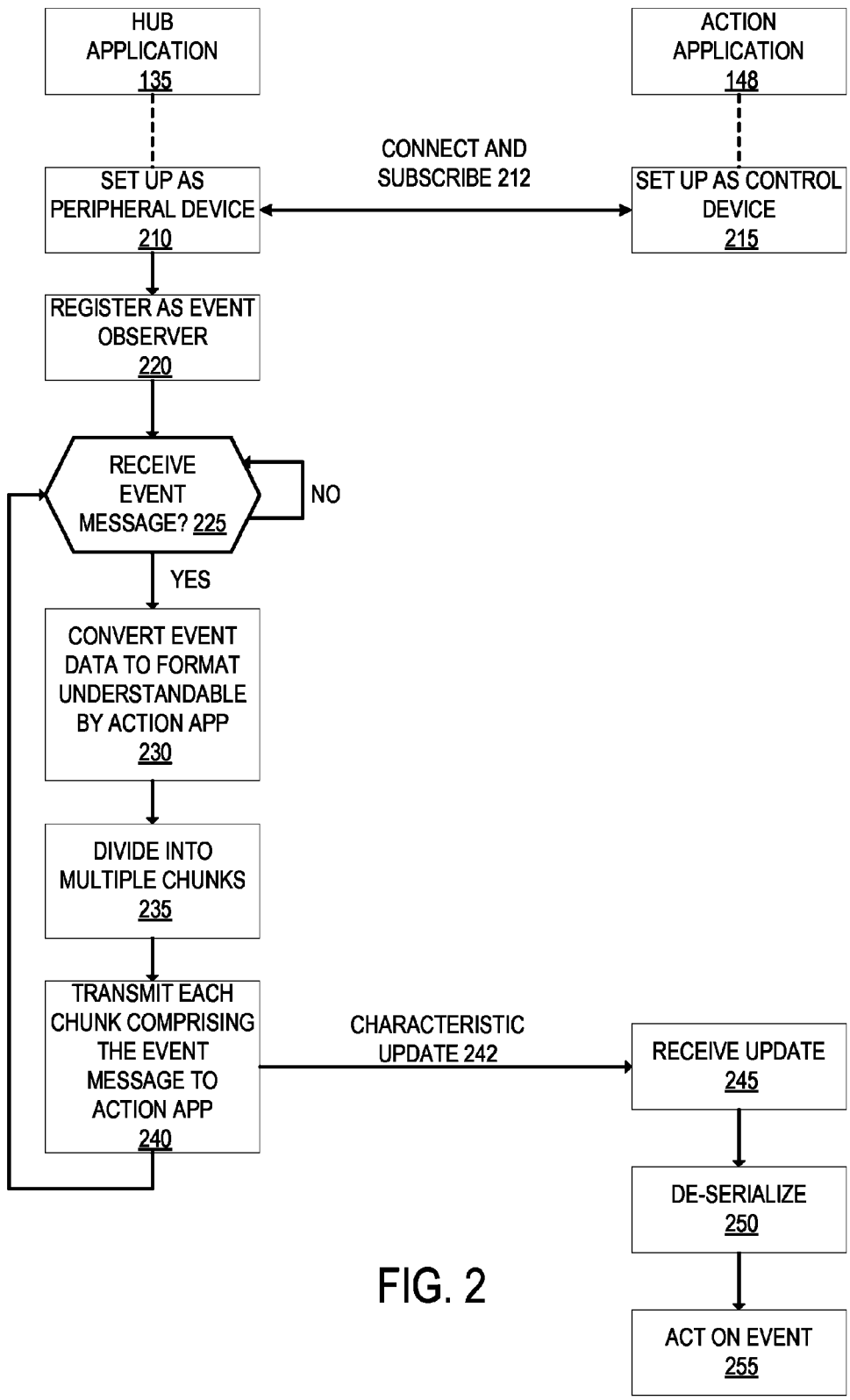
FIG. 2 is a flow diagram illustrating exemplary operations performed by the hub application and the action application of FIG. 1 according to some embodiments described herein.

FIG. 2 is a flow diagram illustrating exemplary operations performed by the hub application 135 and the action application 148 according to some embodiments described herein. The operations of FIG. 2 and other flow diagrams will be described with respect to the exemplary embodiment of FIG. 1. However, it should be understood that the operations of FIG. 2 and the other flow diagrams can be performed by different embodiments than those discussed with respect to FIG. 1, and the embodiments discussed with respect to FIG. 1 can perform different operations than those discussed with respect to FIG. 2 and other flow diagrams.

At operation 210, the hub application 135 is set up as a peripheral device and at operation 215 the action application 148 is set up as a control device. For instance the hub application 135 advertises itself as a peripheral (e.g., a BTLE peripheral) and the action application 148 is set up as a control device (e.g., a BTLE central). Upon the action application 148 discovering the hub application 135, a connection is established between the hub application 135 and the action application 148; and the action application 148 subscribes 212 to one or more characteristics provided by the hub application 135. For instance, the hub application 135 may receive and grant a request from the action application 148 to subscribe to one or more characteristics that correspond with an event. A characteristic is a piece of data that describes an event. For instance, in the case of a heart rate service, a heart rate measurement characteristic may describe a heart rate measurement data. By subscribing to the heart rate measurement characteristic, the control device will receive the heart rate measurement data from the peripheral device when the heart rate measurement data is updated. Control flows from operation 210 to operation 215.

At operation 215, the hub application 135 registers itself as an observer of events from an event device 110. The events may be observed from multiple mechanisms including notification of events through facilities or APIs related to internal events (e.g., a phone event if the hub device 120 has telephony functionality); notification of events from connected devices through facilities or APIs related to external events (e.g., characteristic updates from BTLE devices) and their aggregation; and/or receiving notification of events from peripheral devices directly.

Figure 3:
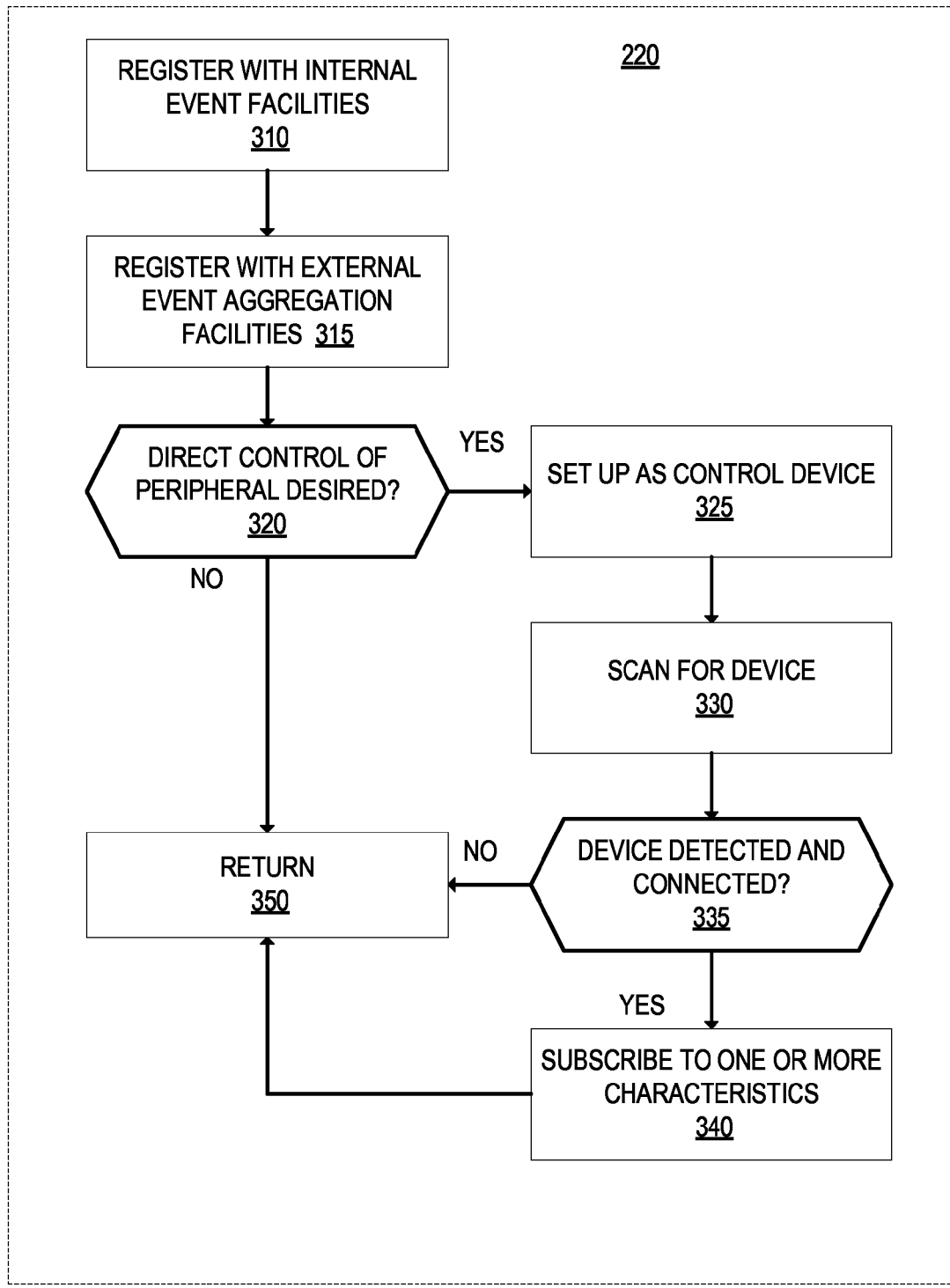
FIG. 3 is a flow diagram that illustrates exemplary operations for registering the hub application of FIG. 1 as an observer of events according to one embodiment.

FIG. 3 is a flow diagram that illustrates exemplary operations for registering the hub application 135 as an observer of events according to one embodiment. At operation 310, the hub application 135 registers with internal event facilities. For instance, with respect to FIG. 1, the hub device 120 includes the internal events API 124 that provides functionality for receiving internal events. For instance, if the hub device 120 has telephony functionality, the internal events API 124 may allow for the hub application 135 to register for phone events (e.g., phone call received, phone call being placed, phone call ending, phone call missed, etc.). As another example, if the hub device 120 includes an ambient light sensor, the internal events API 124 may allow for the hub application 135 to register for ambient light events (e.g., the ambient light has gotten darker or lighter).

Flow then moves to operation 315 where the hub application 135 registers with external event aggregation facilities. For instance, with respect to FIG. 1, the hub device 120 includes the external events API 126 that provides functionality for receiving events that occur on devices connected to the hub device 120. As an example, the external events API 126 may provide support for the hub application 135 to receive health related events from a connected fitness band (e.g., a heart rate as determined by the connected fitness band).

Next, at operation 320, if direct control of a peripheral is desired (e.g., the hub application 135 wants to connect with an event device directly because, for example, there is not an external events API that provides a connection to that event device), then flow moves to operation 325, otherwise flow moves to operation 350. At operation 325, the hub application 135 is set up as a control device (e.g., a BTLE central). Flow moves from operation 325 to operation 330 where the hub application 135 scans for a device that advertises a desired service. It should be understood that this operation may be performed periodically to find new devices. If a device is detected and a connection is established, then flow moves from operation 335 to operation 340 where the hub application 135 subscribes to one or more characteristics for services advertised by the connected event device. Flow then moves to operation 350 where the operations end. It should be understood that not all operations are performed in some embodiments. For instance, if the hub application 135 does not detect events internally, operation 310 will not be performed. As another example, if the hub application 135 does not include an external events API, the operation 315 will not be performed.

Referring back to FIG. 2, after registering as an event observer, flow moves from operation 220 to operation 225 where the hub application 135 determines whether it has received an event message. If it has received an event message, then flow moves to operation 230, otherwise the hub application 135 remains waiting for an event message to be received. The event message may be received from any of the observed points (e.g., internal event received via the internal events API 124, an internal event received via the external events API 126, or an event received directly from an event device 110). In a specific example, the event message is received from an event device 110 and describes an event detected or occurring on the event device 110.

Different event messages may be in different formats for the different event devices. For example, because of a lack of standardization across much of the IoT sphere, there may be multiple different protocols that are used to communicate with different event devices such as fitness bands. At operation 230, the hub application 135 converts the received event data to a format that is understandable by the action application 148. In an embodiment, the hub application 135 includes an event mapping for the event devices 110A-N to convert received event data into a format understandable by the action application 148. This prevents the action application 148 from having to understand multiple different protocols for the different event devices. Flow then moves to operation 235.

The hub application 135 communicates event data to the action application 148. Current PAN communication protocols, such as BTLE, do not include the concept of a push notification. However, the hub application 135 and action application 148 leverage the action application 148 being subscribed to one or more characteristics to communicate the event information to the action application 148. Communication protocols that include the ability to subscribe to characteristics, such as BTLE, typically have a size limit for the characteristic update. For example, BTLE currently has a 20 byte size limit. However, the event information typically is larger than the 20 byte size limit and can be upwards of hundreds of bytes. In an embodiment, the hub application 135 divides the received event message into multiple chunks where each chunk is within the data value update limit of the communication link and transmits each chunk, one-by-one, to the action application 148 until all the data has been transmitted. The action application 148 rebuilds the event information from the transmitted chunks.

At operation 235, the hub application 135 divides the received event message into multiple chunks where each chunk is within the data value update limit of the communication protocol. The total number of chunks depends on the amount of data being transferred and the size limit For example, the total number of chunks may be represented as the ceiling of the size of data of the event divided by the size limit of the communication protocols. Next, flow moves to operation 240 where the hub application 135 transmits each chunk comprising the event message to the action application 148 (e.g., one at a time) to allow the action device to take one or more actions in response to the event. The transmission of each chunk occurs in a characteristic update 242. In an embodiment, the last chunk may include an end marker to let the action application 148 know when the data has been fully transmitted.

At operation 245, the action application 148 receives the characteristic updates that comprise the event message from the hub application 135. Next, at operation 250, the action application 148 de-serializes the chunks thereby rebuilding the event message. Then, at operation 255, the action application 148 takes one or more acts depending on the event message.

Figure 4:
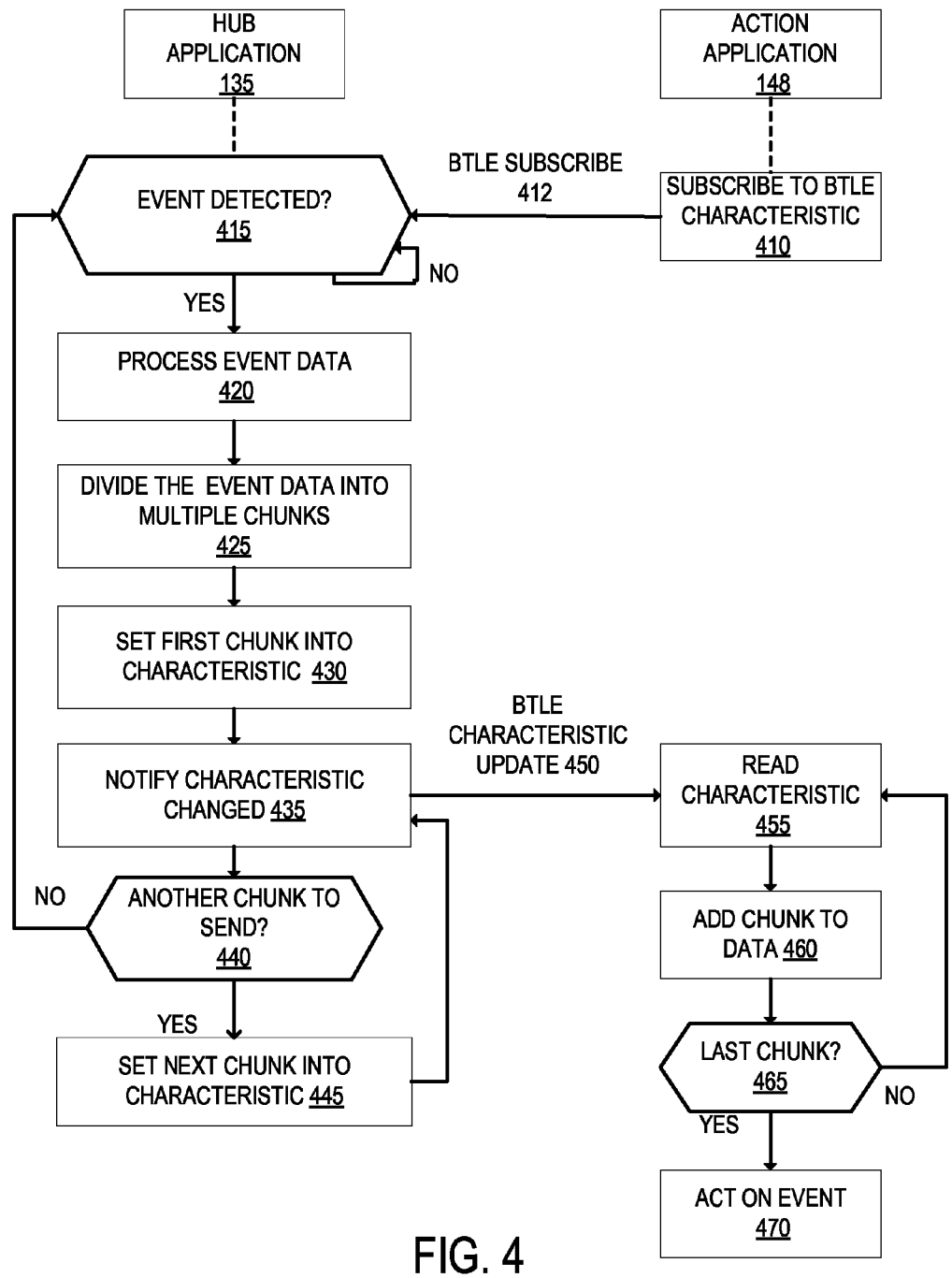
FIG. 4 is a flow diagram that illustrates a specific embodiment performed by the hub application and the action application of FIG. 1 where the communication protocol is BTLE according to one embodiment.

FIG. 4 is a flow diagram that illustrates a specific embodiment performed by the hub application 135 and the action application 148 where the communication protocol is BTLE according to one embodiment. In the operations of FIG. 4, the hub application 135 is established as a BTLE peripheral and the action application 148 is established as a BTLE central.

At operation 410, the action application 148 subscribes 412 to one or more BTLE characteristics advertised by the hub application 135. Upon the hub application 135 detecting an event (e.g., receiving an event message in a similar way as described in operation 225), flow moves to operation 420 where the hub application 135 processes the event data. For example, the hub application 135 may convert the received event data into a format that is understandable by the action application 148. Next, at operation 425, the hub application 135 divides the event data into multiple chunks that each fit within the 20 byte size limit of characteristic updates defined by BTLE. Next, at operation 430, the hub application 135 sets the first chunk into a characteristic update and notifies the action application 148 of the characteristic change at operation 435. Flow moves from operation 435 to operation 440 where the hub application 135 determines if there are more chunks to be sent and if so then flow moves to operation 445 where the hub application 135 sets the next chunk into a characteristic update and flow moves back to operation 435 to transmit that chunk to the action application 148. If there are no more chunks to be sent, then flow moves back to operation 415 where the hub application 135 waits for further events. The BTLE characteristic update 450 is communicated to the action application 148, which reads the characteristic update at operation 455 and adds that chunk to the event data at operation 460. At operation 465, the action application 148 determines whether that is the last chunk; if it is not, then flow moves back to operation 455; otherwise flow moves to operation 470 where the action application 148 acts on the event.

Figure 5:
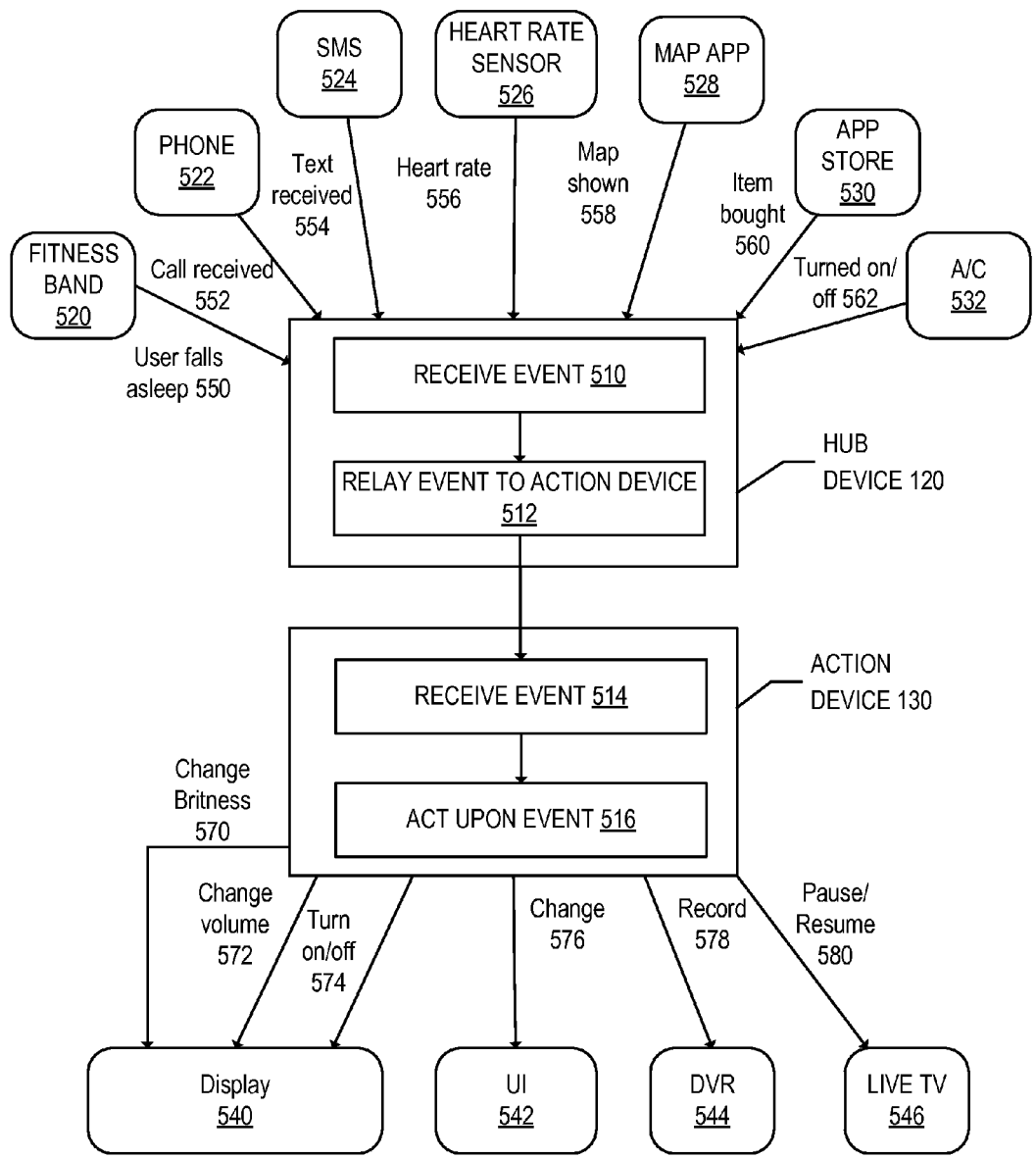
FIG. 5 illustrates exemplary actions that can be taken in response to particular events according to one embodiment.

The act(s) that are taken by the action application 148 depends on the event communicated to the action application 148. FIG. 5 illustrates exemplary actions that can be taken in response to particular events according to one embodiment. FIG. 5 provides examples of several event devices including a fitness band 520, a phone 522, an SMS device 524, a heart rate sensor 526, a map application 528, an app store 530, and an air conditioning unit 532. The hub device 120 receives an event from one of the event devices at operation 510 and relays the event to the action device 130 at operation 512. Example events include a user falling asleep 550 received from the fitness band 520; a call being received 552 received from the phone 522, a text message being received 554 received from the SMS device 524, a heart rate update 556 received from the heart rate sensor 526, a map shown 558 received from the map application 528, an item bought 560 received from the app store 530, and an air conditioning unit turning on or off 562 received from the air conditioning unit 532. The action device 130 receives the event information relayed from the hub device 120 at operation 514 and acts upon the event at operation 516. For example, the action device 130 can cause a change in the display 540 (which may be part of the action device 130 or connected to the action device 130) such as changing the brightness 570 of the display, changing the volume 572 of the display, and/or turning on/off 574 the display. As another example, the action device 130 can cause a change 576 of the user interface 542. As another example, the action device 130 can cause the DVR 544 to begin recording 578. As yet another example, the action device 130 can cause live television 546 to be paused or resumed 580. It should be understood that the events and actions described in FIG. 5 are exemplary and different events and/or actions can be used according to embodiments described herein.

Figure 6:
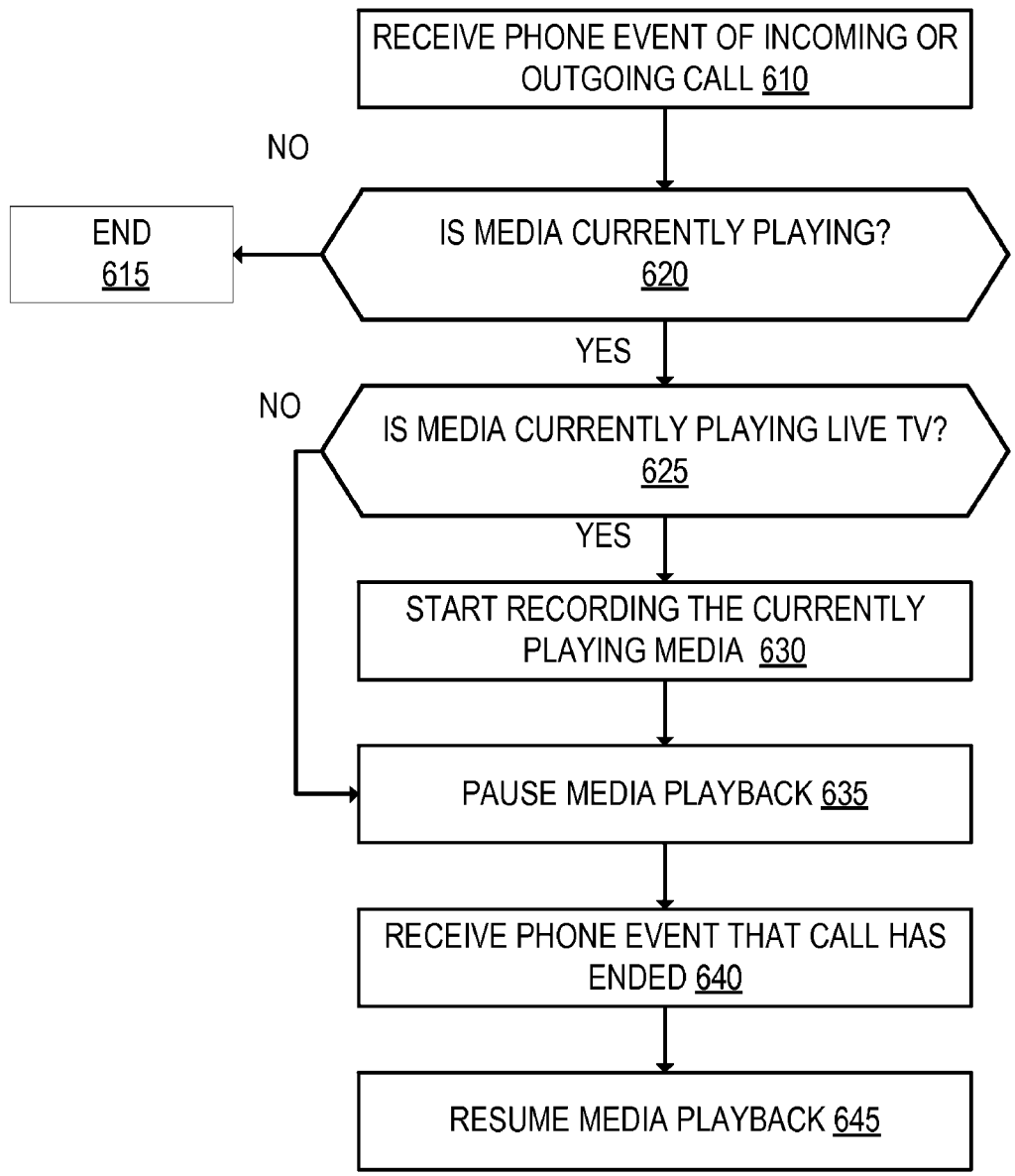
FIG. 6 illustrates exemplary operations for an action device responding to a phone event according to an embodiment.

FIG. 6 illustrates exemplary operations for an action device responding to a phone event according to an embodiment. In the embodiment of FIG. 6, the action device controls media playback. For example, the action device may be a set-top box or other device that controls media playback. At operation 610, a phone event of incoming or outgoing call is received at the action application 148. The phone event may be received from the hub application 135 via an event device that has telephony functionality connected to the hub device 120 or part of the hub device 120 experiencing such event. Although not illustrated in FIG. 6, the hub application 135 may transmit the phone event to the action application 148 as previously described. After receiving the phone event, flow moves to operation 620 where the action application 148 determines whether media is currently playing. If media is not currently playing, then flow moves to operation 615 and the operations end. If media is currently playing, then flow moves to operation 625 where the action application 148 determines whether the media currently playing is live television. If it is not live television (e.g., the currently playing media may be a video-on-demand asset, a recorded media asset), then flow moves to operation 635. If the currently playing media program is live television, then flow moves to operation 630 where the action application 148 causes a recording of the currently playing media to be started. For instance, the action application 148 sends an instruction to a DVR (which may be incorporated into the action device 130 or connected to the action device 130) to begin recording the currently playing media program. Flow moves from operation 630 to operation 635. At operation 635, the action application 148 causes the playback of the currently playing media program to be paused. For example, the action application 148 sends an instruction to a DVR (which may be incorporated into the action device 130 or connected to the action device 130) to pause the currently playing media program. Next, at operation 640, a phone event that the call has ended is received at the action application 148. This phone event may be received in a similar way as the phone event was received as described in operation 610. After receiving the phone event that the call has ended, flow moves to operation 645 where the action application 148 causes the playback of the media program to be resumed. For instance, the action application 148 sends an instruction to a DVR (which may be incorporated into the action device 130 or connected to the action device 130) to resume playing the currently playing media program. In the case that the currently playing program was live television, the action application 148 may also cause an option to be displayed to the user that allows the user to jump back to the current live television. Also, although not illustrated in FIG. 6, the action application may cause notifications to be displayed on the user interface of the various events and/or change the brightness (e.g., dim the user interface) to alert the user of the incoming call. This notification may also identify the calling party.

Figure 7:
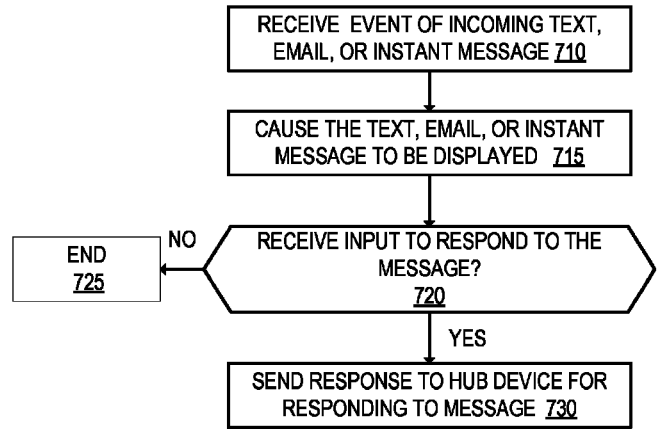
FIG. 7 illustrates exemplary operations performed by an action device for responding to an incoming text message, email message, or instant message, according to an embodiment.

In an embodiment, the display of the action device, or connected to the action device, may display information related to the event received from the hub device. FIG. 7 illustrates exemplary operations performed by an action device for responding to an incoming text message, email message, or instant message, according to an embodiment. At operation 710, a messaging event (e.g., an incoming text message, an incoming email message, or an incoming instant message) is received at the action application 148. This messaging event may be received from the hub application 135 via an event device connected to, or part of, the hub device 120 that has messaging functionality. Although not illustrated in FIG. 7, the hub application 135 may transmit the messaging event to the action application 148 as previously described. Next, at operation 715, the action application 148 causes the message (e.g., the text, email, or instant message) to be displayed. For instance, the action application 148 sends an instruction to the user interface of the action device 130 to display the message. The message event may be displayed in a floating object that is overlaid on the display. The displayed message may disappear after a period of time and/or after the user dismisses the message. In an embodiment, the user may also respond to the message by, for example, using a control to type a response or by using a voice interface to compose a response to the message. If the action device is a device that controls playback of media (e.g., a set-top box), this may allow the user to carry out a textual conversation while using their television without opening their native messaging application. Thus, at operation 720, the action application 148 determines whether it has received input to respond to the message. If it has not, then flow moves to operation 725 where operations end. If input has been received to respond to the message, the action application 148 causes the response to be sent to the hub device 120 for responding to the message at operation 730. The hub device 120 in turn receives the response and causes the response to be sent.

Figure 8:
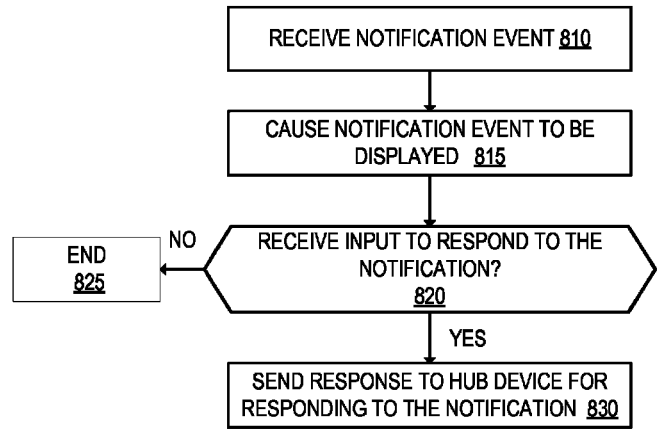
FIG. 8 illustrates exemplary operations performed by an action device for responding to a notification event according to an embodiment.

In an embodiment, the action device may display a notification related to an event received from the hub device. Many different notifications can be generated including notifications generated by the hub device 120 itself and/or remotely provided to the hub device 120. For instance, a notification can be generated upon receipt of a phone call, email, text message, instant message, and/or in-app communication. Typically each notification includes a title, a textual description, an icon (for the application that is associated with the notification), and/or a sound. The hub device 120 communicates the notification event to the action device 130 for the action device to display and/or allow the user to respond. FIG. 8 illustrates exemplary operations performed by an action device for responding to a notification event according to an embodiment. At operation 810, the action application 148 receives a notification event from the hub application 135. Next, at operation 815, the action application 148 causes the notification event to be displayed on a display of, or connected to, the action device 130. For instance, the action application 148 sends an instruction to the user interface of the action device 130 to display the notification event. The notification event may be displayed in a floating object that is overlaid on the display. The displayed notification may disappear after a period of time and/or after the user dismisses the notification. In an embodiment, the user may also respond to the notification by, for example, using a control to type a response or by using a voice interface to compose a response to the notification. If the action device is a device that controls playback of media (e.g., a set-top box), this may allow the user to respond to the notification without opening the application that generated the event. Thus, at operation 820, the action application 148 determines whether it has received input to respond to the notification. If it has not, then flow moves to operation 825 where operations end. If input has been received to respond to the notification, the action application 148 causes the response to be sent to the hub device 120 for responding to the notification at operation 830. The hub device 120 in turn receives the response and causes the response to be sent.

Figure 9:
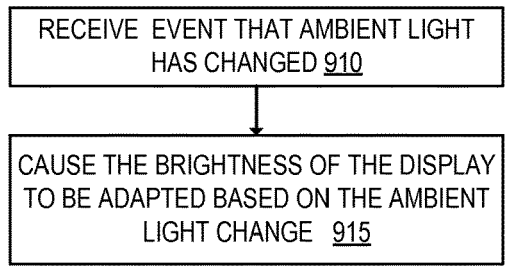
FIG. 9 illustrates exemplary operations performed by an action device to change the brightness of the display depending on an ambient light change according to an embodiment.

In an embodiment, the action device may adapt the brightness of the display depending on an ambient light change. FIG. 9 illustrates exemplary operations performed by an action device to change the brightness of the display depending on an ambient light change according to an embodiment. For example, if the ambient light has increased, the brightness of the display of the action device may also be increased. If the ambient light has decreased, the brightness of the display of the action device 130 may be decreased. At operation 910, the action application 148 receives an event message from the hub application 135 that describes a change in ambient light. The event message may indicate whether the brightness has increased or decreased. Next, at operation 915, the action application 148 causes the brightness of the display to be adapted based on the ambient light change. For example, the action application 148 may send an instruction to the display to increase its brightness or decrease its brightness (depending on the ambient light change). In an example where the action device is a device that controls playback of media and is connected to a television (e.g., the action device is a set-top box), the action application 148 may send the instruction to the television to increase/decrease its brightness.

Figure 10:
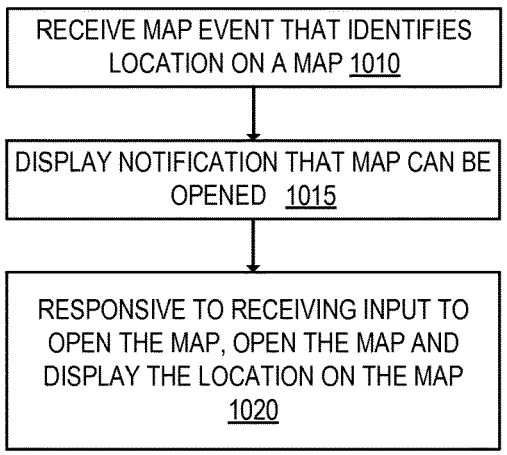
FIG. 10 illustrates exemplary operations performed by an action device to display an interactive graphical map application on its display according to an embodiment.

In an embodiment, the action device may display an interactive graphical map application on its display. FIG. 10 illustrates exemplary operations performed by an action device to display an interactive graphical map application on its display according to an embodiment. At operation 1010, the action application 148 receives a map event from the hub application 135 that identifies a location on a graphical map. The map event may display map parameters such as latitude, longitude, and area covered. The map event may be generated as a result of a user using a map on an event device such as a mobile device. Next, at operation 1015, the action application 148 displays a notification on its display that the map can be opened and the location shown to the user on the display of the action device 130. Since the display of the action device 130 may be larger than the display of the event device that generated the map event, the advantage of seeing the map on the display of the action device 130 is its bigger size and potentially higher resolution afforded by the larger and higher-resolving display. Next, at operation 1020, responsive to the action application 148 receiving input to open the map, the action application 148 opens the map application and displays the location on the map. As the user continues to use the map application on the event device, the event device continues to produce map events that specify the updated location that will be shown on the display of the action device. Thus, the action device continues to render the map as the user navigates around the map using their event device. When the user closes the map on the event device, the action device will also cause the map application to be closed.

Figure 11:
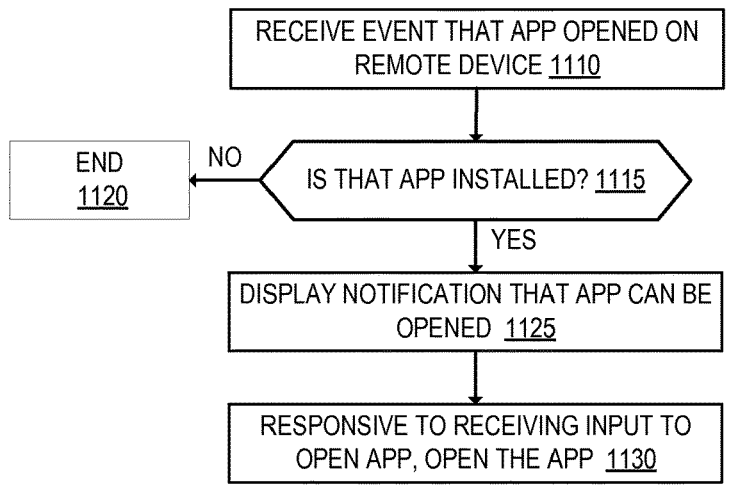
FIG. 11 illustrates exemplary operations performed by an action device to offer usage of an application according to an embodiment.

In an embodiment, the hub device may detect usage of an application on the event device and offer to the user to use the application on the action device. FIG. 11 illustrates exemplary operations performed by an action device to offer usage of an application according to an embodiment. At operation 1110, the action application 148 receives an event that describes an application being opened on a remote device. For instance, a user has opened an application on their mobile device and the mobile device generated an event that describes the application being opened that was received by the hub application 135 and provided to the action application 148. Next, at operation 1115, the action application 148 determines whether a corresponding application is installed on the action device 130 (e.g., the same application or an application designed for the form factor of the action device 130 that may take advantage of increased display size). For instance, the action application 148 checks a list of installed applications to determine whether a corresponding application is installed. If a corresponding application is not installed, then flow moves to operation 1120 where operations end. Alternatively, if a corresponding application is not installed, the action application 148 may display a message that notifies the user that a corresponding application can be installed and the user can choose whether to install the application. If a corresponding application is installed, then flow moves to operation 1125 where the action application 148 displays a notification that the application can be opened on the action device 130. For instance, the action application 148 sends an instruction to the user interface of the action device 130 to display the notification that the application can be opened on the action device 130. The notification may be displayed in a floating object that is overlaid on the display. Next, at operation 1130, responsive to the action application 148 receiving input to open the application, the action application 148 opens the application.

Figure 12:
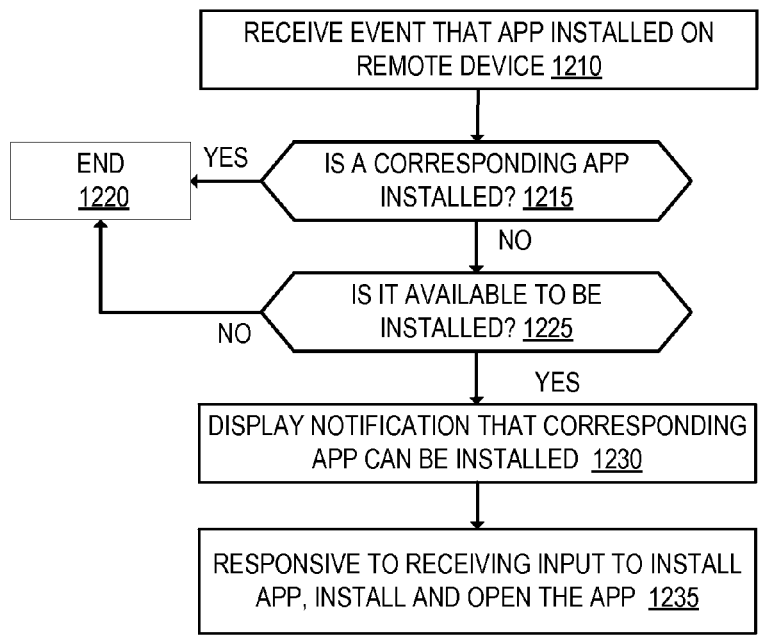
FIG. 12 illustrates exemplary operations performed by an action device to offer to install an application according to an embodiment.

In an embodiment, the hub device may detect that an application was installed on an event device and cause the action device to offer to install a corresponding application on the action device. FIG. 12 illustrates exemplary operations performed by an action device to offer to install an application according to an embodiment. At operation 1210, the action application 148 receives an event that describes that an application has been installed on a remote device. For instance, a user has installed an application on their mobile device and the mobile device generated an event that describes the application being installed that is received by the hub application 135 and provided to the action application 148. The event may specify the name of the application being installed. Next, at operation 1215, the action application 148 determines whether a corresponding application is installed on the action device 130. For instance, the action application 148 checks a list of installed applications to determine whether a corresponding application is installed. If a corresponding application is installed, then flow moves to operation 1220 where operations end. If a corresponding application is not installed, then flow moves to operation 1225 where the action application 148 determines whether the corresponding application is available to be installed on the action device 130. For instance, a corresponding application may not exist for the action device 130. If a corresponding application is not available to be installed, flow moves to operation 1220 where operations end. If a corresponding application is available to be installed, then flow moves to operation 1230 where the action application 148 displays a notification that a corresponding application can be installed. For instance, the action application 148 sends an instruction to the user interface of the action device 130 to display the notification that a corresponding application can be installed on the action device 130. The notification may be displayed in a floating object that is overlaid on the display. Next, at operation 1235, responsive to the action application 148 receiving input to install the application, the action application 148 causes the application to be installed and opened.

Figure 13:
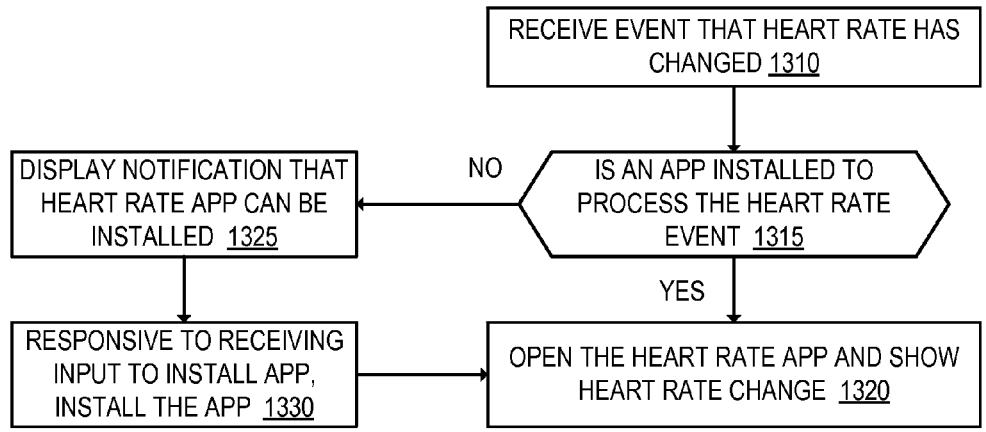
FIG. 13 illustrates exemplary operations performed by an action device to display heart rate information according to an embodiment.

In an embodiment, the action device may display heart rate information generated by a remote heart rate sensor. For example, if the action device controls media playback (e.g., is a set-top box), the heart rate can be displayed on the display of the action device while the user is exercising (e.g., displayed in an overlay on top of a television program while the user is working out). FIG. 13 illustrates exemplary operations performed by an action device to display heart rate information according to an embodiment. At operation 1310, the action application 148 receives from the hub application 135 an event that describes a heart rate. For instance, a fitness band connected to the hub device 120 may generate and transmit a heart rate event that is then provided to the action application 148. Next, at operation 1315, the action application 148 determines whether an application is installed on the action device 130 that is capable of processing the heart rate event. If such an application is not installed on the action device 130, then operations move to operation 1325 where the action application 148 displays a notification that a heart rate application can be installed. For instance, the action application 148 sends an instruction to the user interface of the action device 130 to display the notification that a heart rate application can be installed on the action device 130. The notification may be displayed in a floating object that is overlaid on the display. Flow moves from operation 1325 to operation 1330, where, responsive to the action application 148 receiving input to install the heart rate application, the action application 148 causes the application to be installed and then flow moves to operation 1320. If an application is installed to process the heart rate event, then flow moves to operation 1315 to operation 1320 where the action application 148 opens the heart rate application and displays the heart rate reflected in the event. For instance, the action application 148 sends an instruction to the user interface of the action device 130 to display the heart rate. The heart rate can be overlaid over the existing information on the display.

Figure 14:
FIG. 14 is a flow diagram that illustrates exemplary operations performed by an action device to respond to an event that the user has fallen asleep according to an embodiment.

In an embodiment, the action device reacts upon receiving an event that the user has fallen asleep (e.g., the action device may turn itself off). FIG. 14 is a flow diagram that illustrates exemplary operations performed by an action device to respond to an event that the user has fallen asleep according to an embodiment. At operation 1410, the action application 148 receives from the hub application 135 an event that describes that the user has fallen asleep. For instance, a fitness band or other health device connected to the hub device 120 has detected that the user has fallen asleep and has transmitted an event indicating that the user has fallen asleep to the hub application 135 which then provides this event to the action application 148. Next, at operation 1415, the action application 148 responds to the event including turning off the device and optionally recording any currently playing media program. For example, in the case that the action device 130 controls playback of media programs and includes the ability to record a currently playing program (e.g., record live TV), the action device may begin recording the currently playing program upon receiving the event that the user has fallen asleep. If the currently playing program is a video-on-demand asset, upon receiving an event that the user has fallen asleep, the action application 148 may cause a bookmark to be set at that time and optionally may move the bookmark back a given time interval to account for the time the user has not likely watched because they were in the process of falling asleep.

Figure 15:
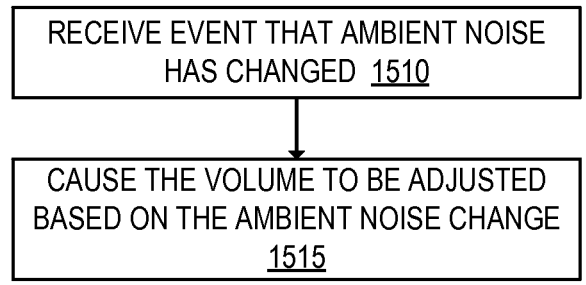
FIG. 15 is a flow diagram that illustrates exemplary operations performed by an action device to adjust its volume in response to an event that specifies that the ambient noise has changed according to an embodiment.

In an embodiment, the action device adjusts its volume based on the ambient noise changing. FIG. 15 is a flow diagram that illustrates exemplary operations performed by an action device to adjust its volume in response to an event that specifies that the ambient noise has changed according to an embodiment. At operation 1510, the action application 148 receives from the hub application 135 an event that describes that the ambient noise has changed. By way of example, a device that is typically noisy has been activated or deactivated (e.g., air conditioning unit, house fan, garage door, espresso machine, dishwasher, etc.) and an event that indicates that the device is operating or disengaged is sent to the hub application 135 which then provides the event to the action application 148. Next, at operation 1515, in response to the ambient noise change event, the action application 148 causes the volume to be adjusted based on the ambient noise change. For instance, if the ambient noise change event indicates that the ambient noise level has increased, the action application 148 causes the volume of the action device 130 to be increased; and if the ambient noise change event indicates that the ambient noise level has decreased, the action application 148 causes the volume of the action device 130 to be decreased.

Figure 16:
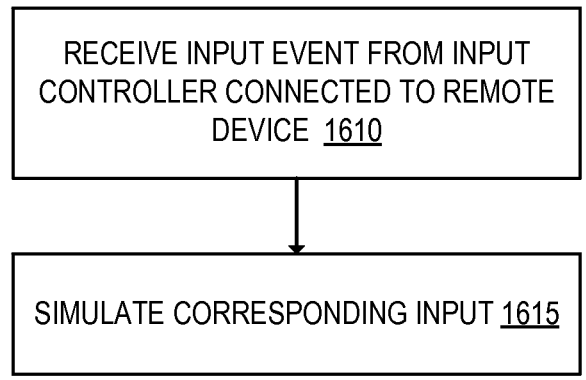
FIG. 16 is a flow diagram that illustrates exemplary operations performed by an action device to simulate input that is received at a remote device according to an embodiment.

In an embodiment, the action device responds to input provided to the hub device through an input controller connected to the hub device. For instance, the action device may simulate input that is provided through a keyboard or game pad that is connected to the hub device. FIG. 16 is a flow diagram that illustrates exemplary operations performed by an action device to simulate input that is received at a remote device according to an embodiment. At operation 1610, the action application 148 receives from the hub application 135 an event that describes input from an input controller connected to the hub device 120. For example, the input may be received from a keyboard, game pad, or other input device connected to the hub device 120. Next, at operation 1615, the action application 148 simulates corresponding input on the hub device 120. This may allow, for example, a controller that is compatible with the hub device 120 becoming usable on the action device 130 (e.g., a game controller connected to the hub device 120 may be used to play games on the hub device 120; a keyboard connected to the hub device 120 may be used for messaging or use in a web browser on the hub device 120).

Figure 17:
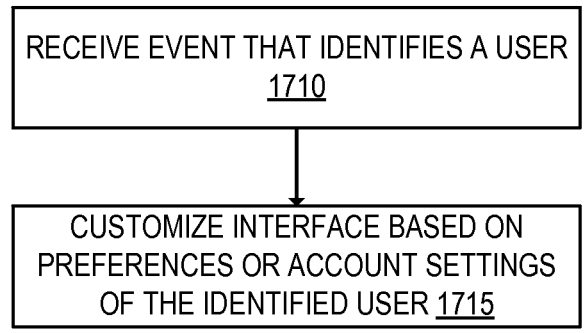
FIG. 17 is a flow diagram that illustrates exemplary operations performed by an action device to customize its interface based on an event that identifies a user according to an embodiment.

In an embodiment, the action device customizes the interface based on an event that identifies a user. FIG. 17 is a flow diagram that illustrates exemplary operations performed by an action device to customize its interface based on an event that identifies a user according to an embodiment. At operation 1710, the action application 148 receives from the hub application 135 an event that identifies a user. The event may include a user identifier that identifies a particular user. For example, a mobile device that is in range of the hub device 120 may include an identifier of the user that is sent to the hub application 135 and then provided to the action application 148. Next, at operation 1715, the action application 148 customizes the interface based on preferences or account settings of the identified user. For example, the action application 148 (or in some embodiments the hub application 135) may use the user identifier to look up associated account information of the user and/or preference information of the user, which may be stored remotely on a server. The associated information may include, among other items, information that indicates the user's favorites and recommended items for viewing. The action application 148 may include, for example, the identified user's favorites or recommended items for viewing in the favorites or recommended items in the user interface of the action device 130.

Figure 18:
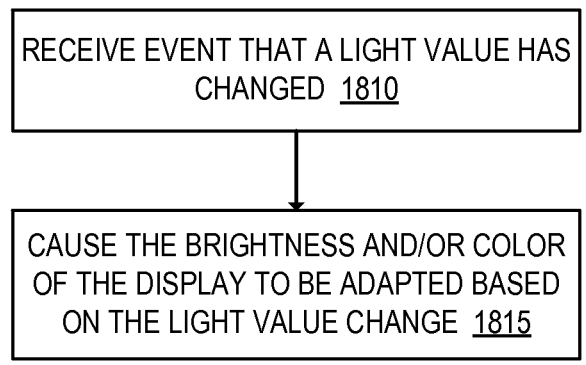
FIG. 18 is a flow diagram that illustrates exemplary operations performed by an action device to adapt the color and/or brightness of its display based on an event that indicates a light value has changed according to an embodiment.

In an embodiment, the action device adapts the color and/or brightness of its display based on an event that indicates a light value has changed. FIG. 18 is a flow diagram that illustrates exemplary operations performed by an action device to adapt the color and/or brightness of its display based on an event that indicates a light value has changed according to an embodiment. At operation 1810, the action application 148 receives from the hub application 135 an event that indicates a light value has changed. For instance, lights may have different color and brightness and may report their color/brightness value to the hub application 135 which in turn forwards the event information to the action application 148. Next, at operation 1815, the action application 148 causes the brightness and/or color of the display to be adapted based on the light value change For example, the action application 148 (or in some embodiments the hub application 135) may interpret the light event and cause the display of the action device to be adjusted accordingly. For instance, as the light source turns to a "warmer" color temperature (toward reds), the action application 148 may cause the display to also change to a "warmer" color temperature to achieve a perceived visual color balance. As another example, as the light source gets dimmer, the action application 148 may cause the display to also get dimmer to keep the same perceived brightness.

Figure 19:
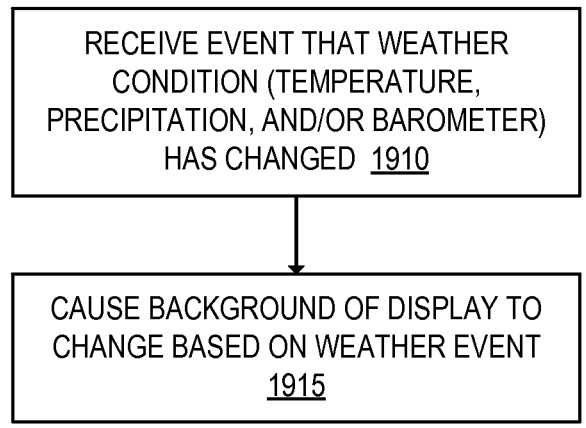
FIG. 19 is a flow diagram that illustrates exemplary operations performed by an action device to adapt the background of the display based on an event that describes a weather condition according to an embodiment.

In an embodiment, the action device adapts the background of the display based on an event that describes a weather condition. FIG. 19 is a flow diagram that illustrates exemplary operations performed by an action device to adapt the background of the display based on an event that describes a weather condition according to an embodiment. At operation 1910, the action application 148 receives from the hub application 135 an event that describes a weather condition. For instance, the hub application 135 may receive an event that describes a temperature reading or barometric reading from an event device and may provide this event to the action application 148. Next, at operation 1915, the action application 148 causes the background of the display to change based on the weather event. For example, if the weather event indicates that snow is falling, the action application 148 may cause the user interface of the action device to show snow falling as a background or screen saver. Similarly, if the weather event indicates that it is raining, the action application 148 may cause the user interface of the action device to show rain as a background or screen saver.

Figure 20:
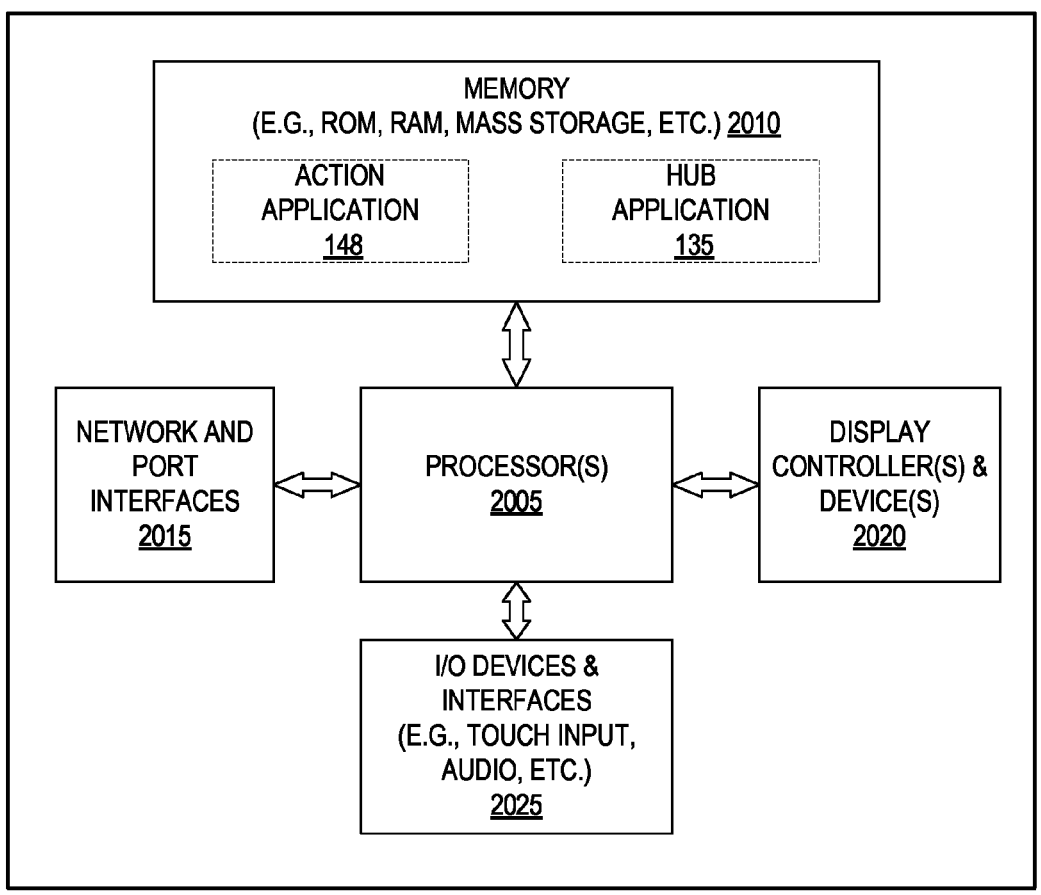
FIG. 20 illustrates a block diagram for an exemplary data processing system 2000 that may be used in some embodiments.

FIG. 20 illustrates a block diagram for an exemplary data processing system 2000 that may be used in some embodiments. Data processing system 2000 includes one or more microprocessors 2005 and connected system components (e.g., multiple connected chips). Alternatively, the data processing system 2000 is a system on a chip. One or more such data processing systems 2000 may be utilized to implement the functionality of the hub device 120 and/or the action device 130. The data processing system 2000 includes memory 2010, which is coupled to the microprocessor(s) 2005. The memory 2010 may be used for storing data, metadata, and programs for execution by the microprocessor(s) 2005. For example, the depicted memory 2010 may store the hub application 135 if the data processing system 2000 implements the functionality of the hub device 120; and may store the action application 148 if the data processing system 2000 implements the functionality of the action device 130; that, when executed by the microprocessor(s) 2005, causes the data processing system 2000 (e.g., the hub device 120, the action device 130) to perform the operations described herein. The memory 2010 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 2010 may be internal or distributed memory.

The data processing system 2000 also includes an audio input/output subsystem 2015 which may include a microphone and/or a speaker for, for example, playing back music or other audio, receiving voice instructions to be executed by the microprocessor(s) 2005, playing audio notifications, etc. A display controller and display device 2020 provides a visual user interface for the user, e.g., GUI elements or windows.

The data processing system 2000 also includes one or more input or output ("I/O") devices and interfaces 2025, which are provided to allow a user to provide input to, receive output from, and otherwise transfer data to and from the system. These I/O devices 2025 may include a mouse, keypad, keyboard, a touch panel or a multi-touch input panel, camera, optical scanner, network interface, modem, other known I/O devices or a combination of such I/O devices. The touch input panel may be a single touch input panel which is activated with a stylus or a finger or a multi-touch input panel which is activated by one finger or a stylus or multiple fingers, and the panel is capable of distinguishing between one or two or three or more touches and is capable of providing inputs derived from those touches to the processing system 2000.

The I/O devices and interfaces 2025 may also include a connector for a dock or a connector for a USB interface, FireWire, Thunderbolt, Ethernet, etc., to connect the system 2000 with another device, external component, or a network. Exemplary I/O devices and interfaces 2025 also include wireless transceivers, such as an IEEE 802.11 transceiver, an infrared transceiver, a Bluetooth transceiver, a wireless cellular telephony transceiver (e.g., 2G, 3G, 4G), or another wireless protocol to connect the data processing system 2000 with another device, external component, or a network and receive stored instructions, data, tokens, etc. It will be appreciated that one or more buses may be used to interconnect the various components shown in FIG. 20.

It will be appreciated that additional components, not shown, may also be part of the system 2000, and, in certain embodiments, fewer components than that shown in FIG. 20 may also be used in a data processing system 2000. For example, in some embodiments where the data processing system 2000 is a set top box, the set top box may include components such as a digital broadcast receiver (e.g., satellite dish receiver, radio frequency (RF) receiver, microwave receiver, multicast listener, etc.) and/or a tuner that tunes to appropriate frequencies or addresses of received content. For example, a tuner may be configured to receive digital broadcast data in a particularized format, such as MPEG-encoded digital video and audio data, as well as digital data in many different forms, including software programs and programming information in the form of data files. As another example, the set top box may include a key listener unit to receive authorization and/or session keys transmitted from a server. The keys received by listener unit may be used by cryptographic security services implemented in a protection mechanism in the set top box to enable decryption of the session keys and data.

The techniques shown in the figures can be implemented using code and data stored and executed on one or more electronic devices (e.g., an event device, a hub device, an action device). Such electronic devices store and communicate (internally and/or with other electronic devices over a network) code and data using machine-readable media, such as non-transitory machine-readable storage media (e.g., magnetic disks; optical disks; random access memory; read only memory; flash memory devices; phase-change memory) and transitory machine-readable communication media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device. Of course, one or more parts of an embodiment of the invention may be implemented using different combinations of software, firmware, and/or hardware.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method for communicating an event from an event device to an action device to take one or more actions based on the event, the method comprising:
    receiving, by a hub device, a first event message from the event device that describes the event on the event device, wherein the event device is located remotely from the hub device;
    converting, by the hub device, the first event message to a second event message that is understandable to the action device that is communicatively coupled with the hub device through a communication protocol, wherein the action device controls media playback;
    dividing, by the hub device, the second event message into a first plurality of chunks, wherein each one of the first plurality of chunks is of a size within a data value update limit of the communication protocol, wherein the action device is subscribed to receive updates from the hub device;
    transmitting, by the hub device to the action device, each respective one of the first plurality of chunks over the communication protocol to allow the action device to take one or more actions in response to the second event message;
    receiving, at the hub device, a third event message detected by the hub device, wherein the third event message detected by the hub device indicates a change in ambient light;
    converting, by the hub device, the third event message to a fourth event message that is understandable to the action device;
    dividing, by the hub device, the fourth event message into a second plurality of chunks, wherein each one of the second plurality of chunks is of a size within the data value update limit of the communication protocol; and
    transmitting, by the hub device to the action device, each respective one of the second plurality of chunks over the communication protocol to allow the action device to take one or more actions in response to the fourth event message, wherein the one or more actions in response to the fourth event message includes causing a brightness of a display coupled with the action device to be adapted based on the change in ambient light.

2. The method of claim 1, further comprising:
    registering, by the hub device, as an observer of events from the event device; and
    receiving, from the action device a request to subscribe to one or more characteristics that correspond with the first event message.

3. The method of claim 1, wherein the communication protocol is compliant with Bluetooth Low Energy (BTLE).

4. The method of claim 1, further comprising:
receiving, at the hub device, a fifth event message detected by the hub device, wherein the fifth event message detected by the hub device is a phone event;
converting, by the hub device, the fifth event message to a sixth event message that is understandable to the action device;
dividing, by the hub device, the sixth event message into a third plurality of chunks, wherein each one of the third plurality of chunks is of a size within the data value update limit of the communication protocol; and
transmitting, by the hub device to the action device, each respective one of the third plurality of chunks over the communication protocol to allow the action device to take one or more actions in response to the sixth event message, wherein the one or more actions in response to the sixth event message includes automatically pausing the media playback.

5. The method of claim 1, further comprising:
receiving, at the hub device, a fifth event message detected by the hub device, wherein the fifth event message detected by the hub device is a message event that identifies a message sent to the hub device;
converting, by the hub device, the fifth event message to a sixth event message that is understandable to the action device;
dividing, by the hub device, the sixth event message into a third plurality of chunks, wherein each one of the third plurality of chunks is of a size within the data value update limit of the communication protocol; and
transmitting, by the hub device to the action device, each respective one of the third plurality of chunks over the communication protocol to allow the action device to take one or more actions in response to the sixth event message, wherein the one or more actions in response to the sixth event message includes causing the message sent to the action device to be displayed on the display coupled with the action device.

6. The method of claim 1, wherein the first event message describes a heart rate event on the event device that indicates a heart rate value; and wherein the one or more actions to take in response to the second event message includes displaying the heart rate value on the display coupled with the action device.

7. A hub device that is communicatively coupled with an event device and an action device for communicating an event from the event device to the action device, the hub device comprising:
a set of one or more processors; and
a non-transitory machine-readable storage medium containing code, which when executed by the set of one or more processors, causes the hub device to:
receive a first event message from the event device that describes the event on the event device, wherein the event device is located remotely from the hub device;
convert the first event message to a second event message that is understandable to the action device that is communicatively coupled with the hub device through a communication protocol, wherein the action device controls media playback;
divide the second event message into a first plurality of chunks, wherein each one of the first plurality of chunks is of a size within a data value update limit of the communication protocol, wherein the action device is subscribed to receive updates from the hub device;
transmit, to the action device, each respective one of the first plurality of chunks over the communication protocol to allow the action device to take one or more actions in response to the second event message;
receive a third event message detected by the hub device, wherein the third event message detected by the hub device indicates a change in ambient light;
convert the third event message to a fourth event message that is understandable to the action device;
divide the fourth event message into a second plurality of chunks, wherein each one of the second plurality of chunks is of a size within the data value update limit of the communication protocol; and
transmit, to the action device, each respective one of the second plurality of chunks over the communication protocol to allow the action device to take one or more actions in response to the fourth event message, wherein the one or more actions in response to the fourth event message includes causing a brightness of a display coupled with the action device to be adapted based on the change in ambient light.

8. The hub device of claim 7, wherein the non-transitory machine-readable storage medium further contains code, which when executed by the set of one or more processors, causes the hub device to:
register as an observer of events from the event device; and
receive, from the action device a request to subscribe to one or more characteristics that correspond with the first event message.

9. The hub device of claim 7, wherein the communication protocol is compliant with Bluetooth Low Energy (BTLE).

10. The hub device of claim 7, wherein the non-transitory machine-readable storage medium further contains code, which when executed by the set of one or more processors, causes the hub device to:
receive a fifth event message detected by the hub device, wherein the fifth event message detected by the hub device is a phone event;
convert the fifth event message to a sixth event message that is understandable to the action device;
divide the sixth event message into a third plurality of chunks, wherein each one of the third plurality of chunks is of a size within the data value update limit of the communication protocol; and
transmit, to the action device, each respective one of the third plurality of chunks over the communication protocol to allow the action device to take one or more actions in response to the sixth event message, wherein the one or more actions in response to the sixth event message includes automatically pausing the media playback.

11. The hub device of claim 7, wherein the non-transitory machine-readable storage medium further contains code, which when executed by the set of one or more processors, causes the hub device to:
receive a fifth event message detected by the hub device, wherein the fifth event message detected by the hub device is a message event that identifies a message sent to the hub device;
convert the fifth event message to a sixth event message that is understandable to the action device;
divide the sixth event message into a third plurality of chunks, wherein each one of the third plurality of chunks is of a size within the data value update limit of the communication protocol; and transmit, to the action device, each respective one of the third plurality of chunks over the communication protocol to allow the action device to take one or more actions in response to the sixth event message, wherein the one or more actions in response to the sixth event message includes causing the message sent to the action device to be displayed on the display coupled with the action device.

12. The hub device of claim 7, wherein the first event message describes a heart rate event on the event device that indicates a heart rate value; and wherein the one or more actions to take in response to the second event message includes displaying the heart rate value on the display coupled with the action device.

13. A non-transitory machine-readable storage medium that provides instructions that, when executed by a processor, will cause said processor to perform operations comprising:

receiving, by a hub device, a first event message from an event device that describes an event on the event device, wherein the event device is located remotely from the hub device;

converting, by the hub device, the first event message to a second event message that is understandable to an action device that is communicatively coupled with the hub device through a communication protocol, wherein the action device controls media playback;

dividing, by the hub device, the second event message into a first plurality of chunks, wherein each one of the first plurality of chunks is of a size within a data value update limit of the communication protocol, wherein the action device is subscribed to receive updates from the hub device;

transmitting, by the hub device to the action device, each respective one of the first plurality of chunks over the communication protocol to allow the action device to take one or more actions in response to the second event message;

receiving, at the hub device, a third event message detected by the hub device, wherein the third event message detected by the hub device indicates a change in ambient light;

converting, by the hub device, the third event message to a fourth event message that is understandable to the action device;

dividing, by the hub device, the fourth event message into a second plurality of chunks, wherein each one of the second plurality of chunks is of a size within the data value update limit of the communication protocol; and transmitting, by the hub device to the action device, each respective one of the second plurality of chunks over the communication protocol to allow the action device to take one or more actions in response to the fourth event message, wherein the one or more actions in response to the fourth event message includes causing a brightness of a display coupled with the action device to be adapted based on the change in ambient light.

14. The non-transitory machine-readable storage medium of claim 13 that further provides instructions that, when executed by the processor, causes said processor to perform operations comprising:

registering, by the hub device, as an observer of events from the event device; and receiving, from the action device a request to subscribe to one or more characteristics that correspond with the first event message.

15. The non-transitory machine-readable storage medium of claim 13, wherein the communication protocol is compliant with Bluetooth Low Energy (BTLE).

16. The non-transitory machine-readable storage medium of claim 13, wherein the non-transitory machine-readable storage medium further provides instructions that, when executed by the processor, causes the processor to perform operations including:

receiving, at the hub device, a fifth event message detected by the hub device, wherein the fifth event message detected by the hub device is a phone event;

converting, by the hub device, the fifth event message to a sixth event message that is understandable to the action device;

dividing, by the hub device, the sixth event message into a third plurality of chunks, wherein each one of the third plurality of chunks is of a size within the data value update limit of the communication protocol; and transmitting, by the hub device to the action device, each respective one of the third plurality of chunks over the communication protocol to allow the action device to take one or more actions in response to the sixth event message, wherein the one or more actions in response to the sixth event message includes automatically pausing the media playback.

17. The non-transitory machine-readable storage medium of claim 13, wherein the non-transitory machine-readable storage medium further provides instructions that, when executed by the processor, causes the processor to perform operations including:

receiving, at the hub device, a fifth event message detected by the hub device, wherein the fifth event message detected by the hub device is a message event that identifies a message sent to the hub device;

converting, by the hub device, the fifth event message to a sixth event message that is understandable to the action device;

dividing, by the hub device, the sixth event message into a third plurality of chunks, wherein each one of the third plurality of chunks is of a size within the data value update limit of the communication protocol; and transmitting, by the hub device to the action device, each respective one of the third plurality of chunks over the communication protocol to allow the action device to take one or more actions in response to the sixth event message, wherein the one or more actions in response to the fifth event message includes causing the message sent to the action device to be displayed on the display coupled with the action device.

18. The non-transitory machine-readable storage medium of claim 13, wherein the first event message describes a heart rate event on the event device that indicates a heart rate value; and wherein the one or more actions to take in response to the second event message includes displaying the heart rate value on the display coupled with the action device.

* * * * *